United States Patent
Voigtlaender et al.

[11] Patent Number: 6,043,772
[45] Date of Patent: Mar. 28, 2000

[54] MULTI-BEAM AUTOMOBILE RADAR SYSTEM

[75] Inventors: Klaus Voigtlaender, Wangen; Klaus-Peter Wagner, Stuttgart, both of Germany

[73] Assignee: Robert Bosch GmbH, Stuttgart, Germany

[21] Appl. No.: 08/975,621

[22] Filed: Nov. 21, 1997

[30] Foreign Application Priority Data

Nov. 21, 1996 [DE] Germany .......................... 196 48 203

[51] Int. Cl.[7] .................................................. G01S 13/93
[52] U.S. Cl. ............................................. 342/70; 342/175
[58] Field of Search .................. 342/70, 71, 72, 342/175

[56] References Cited

U.S. PATENT DOCUMENTS

| | | | |
|---|---|---|---|
| 3,772,697 | 11/1973 | Ross | 342/21 |
| 4,050,071 | 9/1977 | Clorfeine | 342/117 |
| 4,131,889 | 12/1978 | Gray | 342/114 |
| 4,283,729 | 8/1981 | Richardson | 342/380 |
| 4,420,839 | 12/1983 | Hogerheiden, Jr. | 455/327 |
| 4,757,450 | 7/1988 | Etoh | 364/426 |
| 4,827,270 | 5/1989 | Udagawa et al. | 343/853 |
| 5,208,563 | 5/1993 | Russell et al. | 333/109 |
| 5,481,628 | 1/1996 | Higgins | 342/70 |
| 5,486,832 | 1/1996 | Hulderman | 342/70 |
| 5,546,086 | 8/1996 | Akuzawa et al. | 342/70 |
| 5,583,511 | 12/1996 | Hulderman | 342/175 |
| 5,587,713 | 12/1996 | Pfizenmaier et al. | 342/70 |
| 5,815,112 | 9/1998 | Sasaki et al. | 342/70 |
| 5,877,726 | 3/1999 | Kudoh et al. | 342/70 X |
| 5,905,457 | 5/1999 | Rashid | 342/70 |

FOREIGN PATENT DOCUMENTS

| | | |
|---|---|---|
| 0 498 524 | 8/1992 | European Pat. Off. . |
| 2 290 000 | 12/1995 | United Kingdom . |
| WO 97/02496 | 1/1997 | WIPO . |

*Primary Examiner*—John B. Sotomayor
*Attorney, Agent, or Firm*—Kenyon & Kenyon

[57] ABSTRACT

A multi-beam automobile radar system includes at least one antenna that forms a total of at least two antenna lobes. At least one of these antenna lobes serves to transmit and receive radar signals. At least one other antenna lobe serves only to receive radar signals. An advantage of the automobile radar system is that with one antenna lobe which serves only for receiving radar signals, it is possible to eliminate duplexers, for example, in the form of double rat race arrangements.

14 Claims, 1 Drawing Sheet

MULTI-BEAM AUTOMOBILE RADAR SYSTEM

FIELD OF THE INVENTION

The present invention relates to a multi-beam automobile radar system. Multi-beam means that the radar system is equipped with one or more antennas that form a total of at least two antenna lobes.

BACKGROUND INFORMATION

An automobile radar system is described in European Patent No. 498 524, for example. This publication describes an automobile radar system using two separate antennas for the transmission and reception paths. The transmitting antenna consists of a horn antenna with an antenna lens arranged in front of it, and it has a relatively wide antenna lobe. The receiving antenna consists of a total of three receiving elements and likewise an antenna lens. It forms three antenna lobes which are offset relative to each other and with which the angles of the received radar signals can be assigned. One problem with the radar system described here is that it needs a relatively large amount of space because it uses two separate antennas for the transmitting and receiving functions. Furthermore, relatively long leads to the antenna elements are needed in such a case, which results in an unwanted power loss because of the attenuation, especially in reception. Another problem with such a radar system is correcting its structure-related asymmetry.

A similar principle of a radar system with separate transmitting and receiving lobes is known from *Radar Handbook*, by M. Skolnik, $2^{nd}$ edition, page 20.7f, for example. This book describes a stacked-beam radar which has several receiving lobes stacked vertically. A possible radar target, however, is targeted over only a single transmitting lobe which is wide enough to cover all the receiving lobes. The statements made above are also applicable with regard to the problems or difficulties associated with such a system.

German Patent Application No. 195 30 065.3 (corresponding to International Patent No. WO 97/02496) describes a multi-beam automobile radar system that uses the same antenna for transmitting and receiving. This antenna consists of a total of three transmitting/receiving elements as well as a common antenna lens arranged in front of them. Thus, it also forms three antenna lobes. The problem with such a radar system using a common antenna for transmitting and receiving is in separating the transmission signal from the reception signal. In the radar system described here, this is accomplished with a circuit arrangement which is referred to below as a double rat race. Such a double rat race is a circuit arrangement that is manufactured preferably by the bus strip technology and connects a duplexer and a receiver mixer. Details of operation are described, for example, in British Patent Application No. GB 2 290 000. With the help of such a double rat race, transmission and reception signals can be transmitted and received over one antenna at the same time. Thus, such a double rat race is especially suitable for a radar system according to the FMCW method. However, such a double rat race also leads to system-related attenuation which is apparent with the naturally weak reception signals of a radar system in particular.

SUMMARY OF THE INVENTION

An object of the present invention is thus to provide a multi-beam automobile radar system which can be implemented easily and inexpensively and with which power losses due to components, due in particular to duplexers such as a double rat race or a circulator, are minimized. At the same time, however, the disadvantages of using separate transmitting and receiving antennas are to be avoided.

This object is achieved according to the present invention by the fact that the multi-beam automobile radar system creates a total of at least two antenna lobes, at least one of which can be used for transmitting and receiving radar signals and at least one other of these antenna lobes can be used only for receiving radar signals. According to an embodiment of the present invention, these antenna lobes belong to one antenna and are in one plane.

According to another embodiment of the present invention, one antenna lobe that can be used only for receiving radar signals lies on the main beam axis of the antenna. It is advantageous for at least one additional antenna lobe that can be used for transmitting and receiving radar signals to be on each side of the former antenna lobe.

According to yet another embodiment of the present invention, one antenna lobe that can be used for sending and receiving radar signals lies on the main beam axis of the antenna. It is advantageous for at least one additional antenna lobe that can be used only for receiving radar signals to be on each side of the former antenna lobe.

An advantage of the present invention is that one or more duplexers, in particular double rat race arrangements, can be eliminated in comparison with known multi-beam automobile radar systems. This reduces the power losses caused by signal attenuation due to these circuit arrangements. Another advantage is that the symmetry of the total antenna characteristic curve is improved in the embodiments described below in particular while at the same time retaining the size advantage of a radar system having only one common antenna.

DETAILED DESCRIPTION

Figure 1:
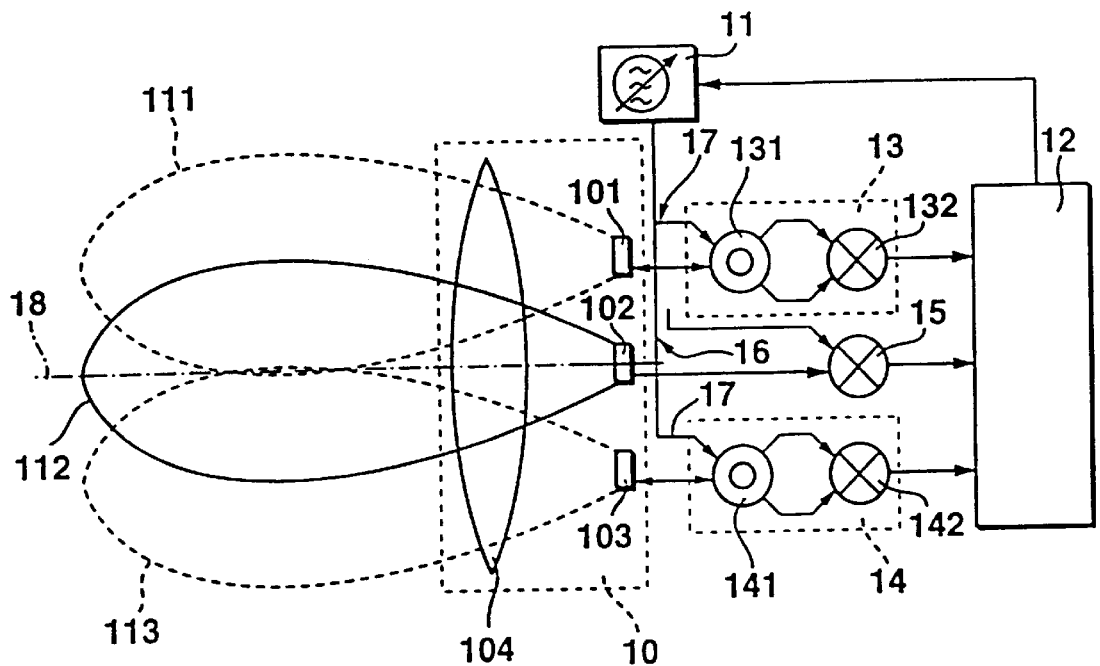
FIG. 1 shows a first embodiment of a radar system according to the present invention, where the central antenna lobe is used only for reception.

FIG. 1 shows a first preferred embodiment of a radar system according to the present invention. It has an antenna 10 that can be used for both transmitting and receiving radar signals. Antenna 10 comprises three feeder lines 101, 102 and 103 and a focusing device 104, preferably an antenna lens in this case. However, other focusing devices, for example, metal reflectors, can also be used here. In combination with antenna lens 104, each of the three feeder lines 101 through 103 creates one antenna lobe. In FIG. 1, antenna lobe 111 belongs to feeder line 101, antenna lobe 112 belongs to feeder line 102, and antenna lobe 113 belongs to feeder line 103. Any side lobes that might develop here and do not serve the function of the radar system can be disregarded. Antenna lobes 111 and 113 are set so that they partially overlap with antenna lobe 112.

Feeder lines 101 through 103 are preferably designed as patch antennas, but they may also be horn antennas or other driver units. In addition to antenna 10, the radar system includes a signal generator 11 and an analysis and control unit 12. The remaining description of this embodiment refers to a radar system that operates according to the FMCW method. The actual invention, however, can also be used for pulse radar systems.

Feeder lines 101 and 103 are each connected to one input of a double rat race 13 and 14, respectively. A second input of the two double rat races 13, 14 is connected to signal generator 11 by signal branches 17. The two double rat races 13, 14 each include a ring branch box 131, 141 and a mixer 132 and 142. Operation of double rat race 13 and 14 is described in the aforementioned British Patent No. 2 290 000. However, it is summarized once more below. The output signals of double rat race 13 and 14, which then correspond to the output signals of mixers 132 and 142, are connected to analysis and control unit 12.

Feeder line 102 is connected directly to one input of a mixer 15 whose output also leads to analysis and control unit 12. The second input of mixer 15 also receives a signal from signal generator 11 via coupling 16. In contrast with signal branch 17, however, only a relatively small signal component is tapped, e.g., with capacitance, via coupling 16. Signal generator 11 is controlled by analysis and control unit 12 over a connection.

A straight line 18 is drawn from feeder line 102, representing the main beam axis of the entire radar system.

To illustrate the operation of the radar system outlined here, the functioning of double rat race 13, 14 is summarized briefly below. Ring branch boxes 131, 141 evenly split a signal received at a terminal to the two adjacent terminals. This means, for example, that a transmission signal from signal generator 11 is split by ring branch box 131 into equal parts to feeder line 102 and to an input of mixer 132. Likewise, part of a signal going over feeder line 102 to ring branch box 131 as the received radar signal is relayed to the second input of mixer 132. The second part goes to the terminal where transmission signals are supplied by signal generator 11. This component is superimposed on the transmission signals supplied from there and is not available for further signal analysis. Mixer 132 is a mixer with which those skilled in the art are familiar and which forms the total frequency and the difference frequency from the two signals sent to it. The difference frequency between the radar signal transmitted and that received is then analyzed here through filters (not shown) according to the FMCW radar method. This difference signal goes as the output signal of the double rat race to analysis and control unit 12, where it is processed further.

A radar system according to the present invention operates as follows: signal generator 11 generates a transmission signal under the control of analysis and control unit 12. This signal goes over ring branch boxes 131 and 141 to feeder lines 101 and 103. From there, the signal is emitted as an electromagnetic wave. According to the directional characteristic of the entire antenna, this electromagnetic wave is propagated mainly within antenna lobes 111 and 113, which are referred to below as ATR for transmit-receive. A radar target struck by this electromagnetic wave reflects part of this wave which is then received over one or more of antenna lobes 111 through 113 and feeder lines 101 through 103. When a reflected radar signal is received over antenna lobe 112 and thus feeder line 102, this signal goes directly to mixer 15, where it is mixed with a component of the transmission signal which goes to the mixer over coupling 16. Reflected radar signals received over feeder lines 101 and 103 go over ring branch boxes 131 and 141 to mixers 132 and 142. There they are also mixed with the instantaneous transmission signal of signal generator 11. All three mixers 132, 142 and 15 thus form a difference frequency between a received radar signal and the instantaneous transmission signal. This difference frequency is analyzed in the analysis and control unit 12 according to the FMCW radar method.

The special feature of the radar system according to the present invention is that a transmission signal is sent only over feeder lines 101 and 103 and thus only over antenna lobes 111 and 113 (ATR). However, because of the fact that these antenna lobes 111 and 113 overlap with antenna lobe 112 (AR, only receive), radar targets that are in the detection range of this lobe 112 are also reached. Their reflection can then also be received by feeder line 102 over lobe 112.

A special advantage of this embodiment is that it reduces power losses due to signal attenuation in the middle antenna lobe, which is the most important antenna lobe for use in a motor vehicle, by eliminating a duplexer here in the form of a double rat race.

Figure 2:
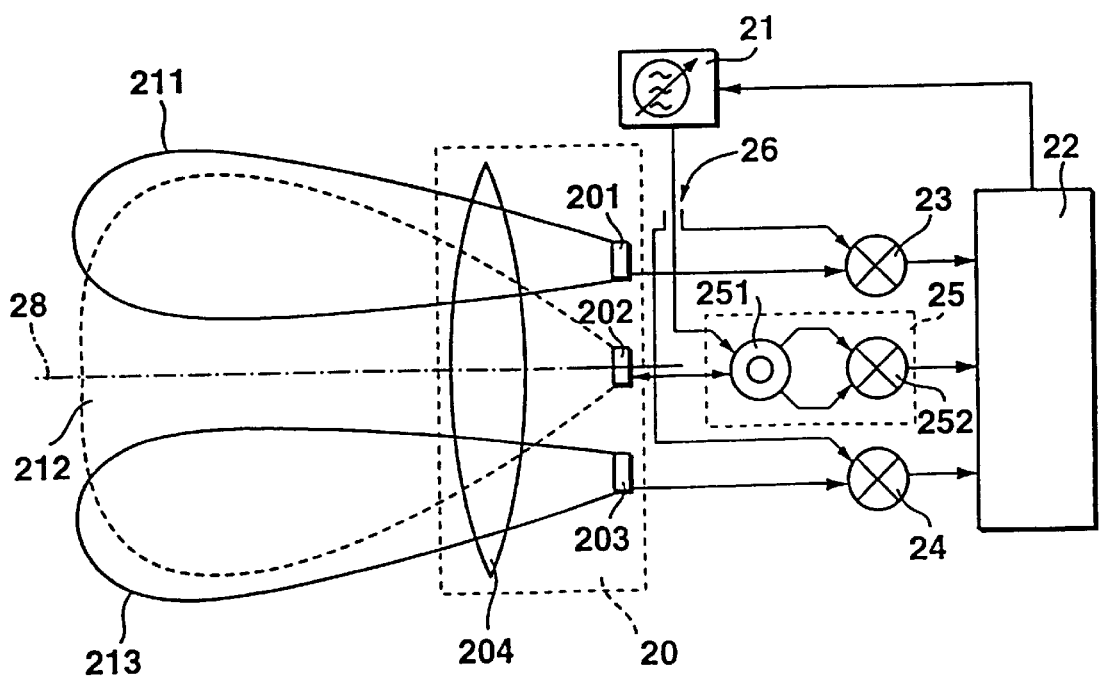
FIG. 2 hows a second embodiment of a radar system according to the present invention, where two outer antenna lobes are used only for reception.

FIG. 2 shows an alternate embodiment of the present invention. The design of this radar system corresponds largely to that of the first embodiment. An antenna 20 comprises three feeder lines 201 through 203 and a dielectric lens 204 as the focusing element. In combination with this lens 204, each feeder line 201 through 203 forms one antenna lobe 211 through 213. In this case the outer antenna lobes 211 and 213 are comparatively narrow and are mostly overlapped by a very wide antenna lobe 212. Antenna lobe 212 is at the center over the main beam axis 28 of the radar system and is the only antenna lobe ATR which is used for both transmitting and receiving. Accordingly, its feeder line 202 is connected to a double rat race 25 composed of a ring branch box 251 and a mixer 252. The output of this double rat race 25 is in turn sent to an analysis and control unit 22. The second input of double rat race 25 is connected to a signal generator 21. Feeder lines 201 and 203 are each connected directly to an input of a mixer 23 and 24. Their output signals are sent to analysis and control unit 22. At their second inputs, mixers 23 and 24 each receive part of the transmission signal from signal generator 21, which is output over a coupling 26, e.g., by capacitance.

As can be seen on the basis of double rat race 25, only one of which is present in this embodiment, signals are transmitted and received only over antenna lobe 212 in a radar system according to this embodiment. Reflections from possible radar targets, however, are also received by feeder lines 201 and 203 over antenna lobes 211 and 213. A radar system according to this embodiment thus needs only one double rat race 25. Another advantage is that with a radar target reached in this way, there is no interference due to multiple reflection of electromagnetic waves.

The different shapes of the individual antenna lobes 111–113 and 211–213 can be achieved with suitably shaped focusing devices. When using an antenna lens 104, 204, for example, it is preferably subdivided into different lens areas whose different shapes in combination with the position of the individual feeder lines 101–103 and 201–203 yield the different geometries of the individual antenna lobes.

What is claimed is:

1. A multi-beam automobile radar system, comprising:
   at least one antenna including at least one feeder line and a focusing device, the at least one antenna forming first and second antenna lobes, the first antenna lobe transmitting and receiving radar signals, the second antenna lobe only receiving radar signals.

2. The system according to claim 1, wherein the at least one antenna includes only one antenna, and the first and second antenna lobes lie in a plane.

3. The system according to claim 1, wherein the at least one feeder line includes at least one patch antenna element, and the focusing device includes a dielectric lens.

4. The system according to claim 1, wherein the second antenna lobe lies on a main beam axis of the at least one antenna.

5. The system according to claim 4, wherein the at least one antenna further forms a third antenna lobe, the first antenna lobe being on a first side of the second antenna lobe, the third antenna lobe being on a second side of the second antenna lobe opposite the first side, the third antenna lobe transmitting and receiving radar signals.

6. The system according to claim 5, wherein the first and third antenna lobes at least partially overlap the second antenna lobe.

7. The system according to claim 5, wherein the first and third antenna lobes are arranged symmetrically with respect to the main beam axis.

8. The system according to claim 1, wherein the first antenna lobe lies over a main beam axis of the at least one antenna.

9. The system according to claim 8, wherein the at least one antenna further forms a third antenna lobe, the second and third antenna lobes being arranged symmetrically on two sides of the first antenna lobe, the third antenna lobe only receiving radar signals.

10. The system according to claim 9, wherein the second and third antenna lobes at least partially overlap the first antenna lobe.

11. The system according to claim 1, wherein the at least one feeder line produces the second antenna lobe and is connected to a double rat race.

12. The system according to claim 1, wherein the at least one feeder line produces the first antenna lobe and is connected directly to a receiving mixer.

13. The system according to claim 1, wherein the at least one feeder line includes a first feeder line forming the first antenna lobe and a second feeder line forming the second antenna lobe, and further comprising a duplexer device associated only with the first feeder line.

14. The system according to claim 13, wherein the duplexer device includes a double rat race device.

\* \* \* \* \*